United States Patent [19]

Carter et al.

[11] Patent Number: 5,219,537
[45] Date of Patent: Jun. 15, 1993

[54] PRODUCTION OF NITRIDE PRODUCTS

[75] Inventors: Michael C. Carter; Bruce W. Gerhold, both of Bartlesville, Okla.

[73] Assignee: Phillips Petroleum Company, Bartlesville, Okla.

[21] Appl. No.: 719,401

[22] Filed: Jun. 24, 1991

Related U.S. Application Data

[62] Division of Ser. No. 504,154, Apr. 3, 1990.

[51] Int. Cl.[5] .................................... C01B 21/068
[52] U.S. Cl. ............................................... 423/344
[58] Field of Search ........................................ 423/344

[56] References Cited

U.S. PATENT DOCUMENTS

| 4,530,825 | 7/1985 | Johansson | 423/344 |
| 4,798,714 | 1/1989 | Schonfelder et al. | 423/344 |
| 4,911,870 | 3/1990 | Komatsu et al. | 423/344 |

FOREIGN PATENT DOCUMENTS

| 0063272 | 10/1982 | European Pat. Off. |
| 0171316 | 2/1986 | European Pat. Off. |
| 0313980 | 5/1989 | European Pat. Off. |
| WO85/01567 | 4/1985 | PCT Int'l Appl. |
| WO86/01875 | 3/1986 | PCT Int'l Appl. |

*Primary Examiner*—Wayne Langel
*Attorney, Agent, or Firm*—William R. Sharp

[57] ABSTRACT

A method and apparatus are provided for producing a product comprising a nitride compound, such as for example silicon nitride. A reactor is provided which has a chamber defined therein which is divided into a combustion zone and a reaction zone. A combustible mixture is injected into the combustion zone in a direction generally toward the reaction zone, and is accordingly combusted in the combustion zone. At least one reactant is injected at the boundary between the zones into the reactor chamber in a direction generally parallel to the longitudinal axis of the chamber so as to react to form raw product comprising the nitride compound. According to another aspect, a raw product powder as produced by the reactor comprises silicon nitride as the nitride compound and further comprises elemental silicon.

9 Claims, 7 Drawing Sheets

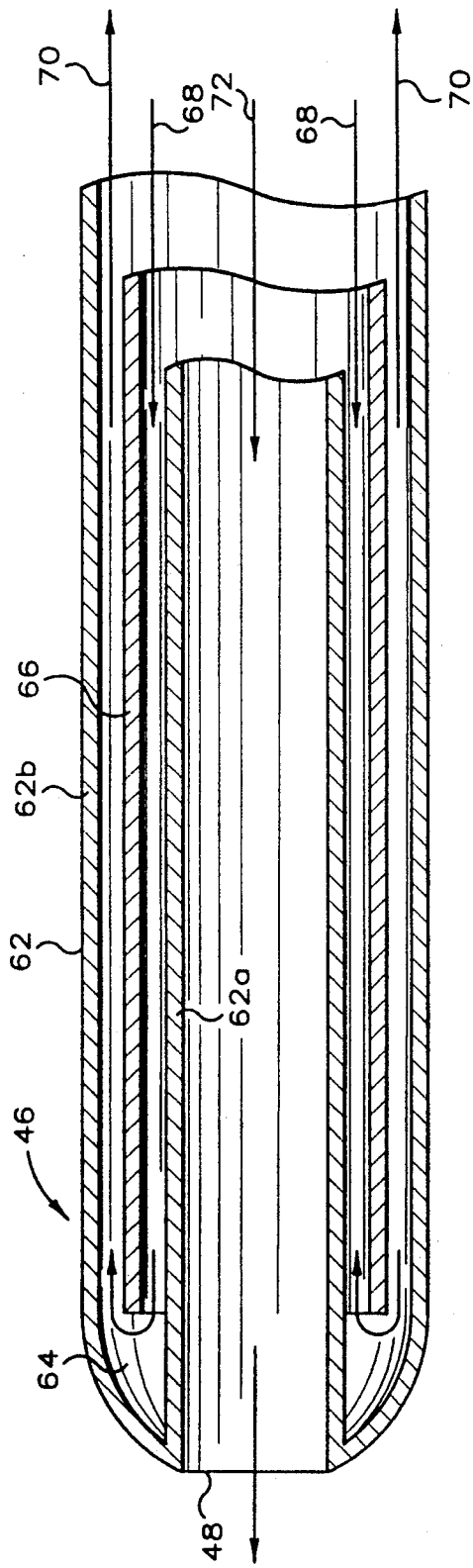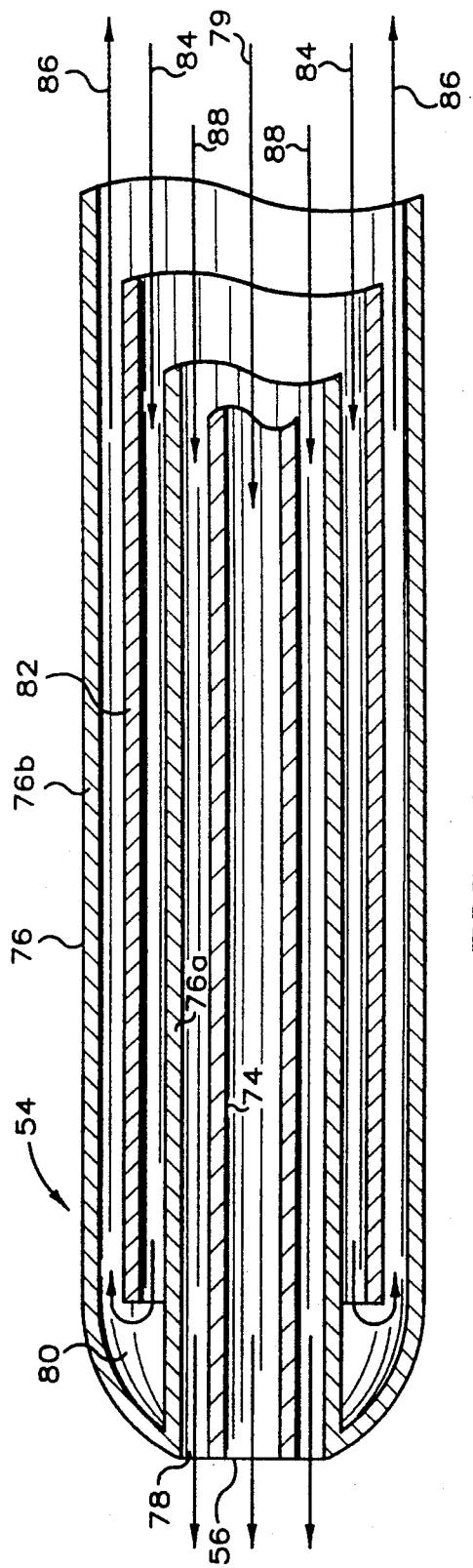
FIG. 3
FIG. 4

PRODUCTION OF NITRIDE PRODUCTS

This application is a divisional of application Ser. No. 504,154 filed Apr. 3, 1990, pending.

BACKGROUND OF THE INVENTION

This invention relates to a method and apparatus for producing nitride products, such as products comprising silicon nitride. In another aspect, the invention relates to such a product.

Various nitride powders, such as silicon nitride, are useful as advanced ceramic materials in the fabrication of highly stressed, wear resistant ceramic parts, such as those employed in heat engines, turbo-charger rotors and heat exchangers. Although synthesis techniques such as those involving plasma and laser heating of gaseous reactants have successfully produced submicron nitride powders, it would be desirable to synthesize sinterable nitride products in a manner better suited to economical, large scale synthesis. In this regard, it is particularly advantageous to minimize the formation of deposits on walls of a nitride reactor so as to thereby minimize down-time for removing such deposits.

SUMMARY OF THE INVENTION

It is, therefore, an object of the invention to provide a method and apparatus which are economical in producing nitride products in a reactor and which minimize reactor wall deposits so as to be well suited to large scale synthesis.

The above object is realized by a method which comprises: providing a reactor having a chamber defined therein which has a longitudinal axis and longitudinally separated upstream and downstream ends, wherein the chamber comprises a combustion zone and a reaction zone such that the combustion zone longitudinally extends from the upstream end to a surface boundary between the zones and such that the reaction zone longitudinally extends from the surface boundary to the downstream end; establishing a flow of a combustible mixture in the combustion zone so as to generally flow in a direction toward the reaction zone, wherein the combustible mixture comprises a mixture of a fuel and an oxidant; combusting the combustible mixture in the combustion zone to produce hot combustion products which flow toward and into the reaction zone; injecting at least one reactant into the reactor chamber from at least one outlet of at least one reactant nozzle such that the reactant(s) exits the reactant nozzle outlet(s) at the surface boundary in a direction generally parallel to the longitudinal axis, wherein temperature conditions in at least a portion of the reaction zone are at least about 1300° C. and wherein the elemental molar ratio of carbon to oxygen for the combination of the combustible mixture and the reactant(s) is at least about 0.7:1, and further wherein the reactant(s) is capable of reacting in the reaction zone to form a nitride compound; whereby a product powder comprising the nitride compound is produced in the reaction zone.

According to another aspect of the invention, there is provided an apparatus which comprises: a reactor as described above; means for injecting a combustible mixture into the combustion zone which comprises at least one combustion zone having at least one outlet which communicates with the combustion zone and which is adapted to release combustible mixture into the combustion zone in a direction generally toward the reaction zone; and means for injecting at least one reactant into the reaction zone which comprises at least one reactant nozzle having at least one outlet which communicates with the chamber at the surface boundary and which is adapted to release the reactant(s) into the reactor chamber in a direction generally parallel to the longitudinal axis of the chamber, wherein the reactant(s) is capable of reacting in the chamber to form a nitride product.

According to yet another aspect of the invention, there is provided a product powder produced by the above described method, where a reactant includes a silicon component, which comprises silicon nitride and elemental silicon and which is characterized by the following weight percentages: silicon in the amount of about 55 to about 75 weight percent; nitrogen in the amount of about 10 to about 40 weight percent; carbon in the amount of about 1 to about 10 weight percent; and oxygen in the amount of about 1 to about 15 weight percent.

According to preferred embodiments of the apparatus and method of the invention described herein, a plurality of combustion nozzle outlets define at least one linear boundary whose projection in a direction generally parallel to the longitudinal axis of the chamber and onto the above-mentioned surface boundary generally surrounds a reaction nozzle outlet. It is also preferred that the reaction nozzle have an outlet which is positioned substantially on the longitudinal axis of the chamber.

The method and apparatus of the invention are economical in requiring the use of inexpensive combustible fuels as the heating source and in requiring a minimal investment for construction of the reactor. Moreover, it has been found that injecting the reactants in a direction generally parallel to the longitudinal axis of the chamber is particularly effective at minimizing deposits on the reactor chamber walls. The preferred relative positioning of the combustion and reactant nozzles as discussed above particularly enhance this desired effect.

BRIEF DESCRIPTION OF THE DRAWINGS

FIGS. 3 and 4 are enlarged cross-sectional views of nozzles which are shown in FIG. 1.

DETAILED DESCRIPTION OF THE INVENTION

Figure 1:
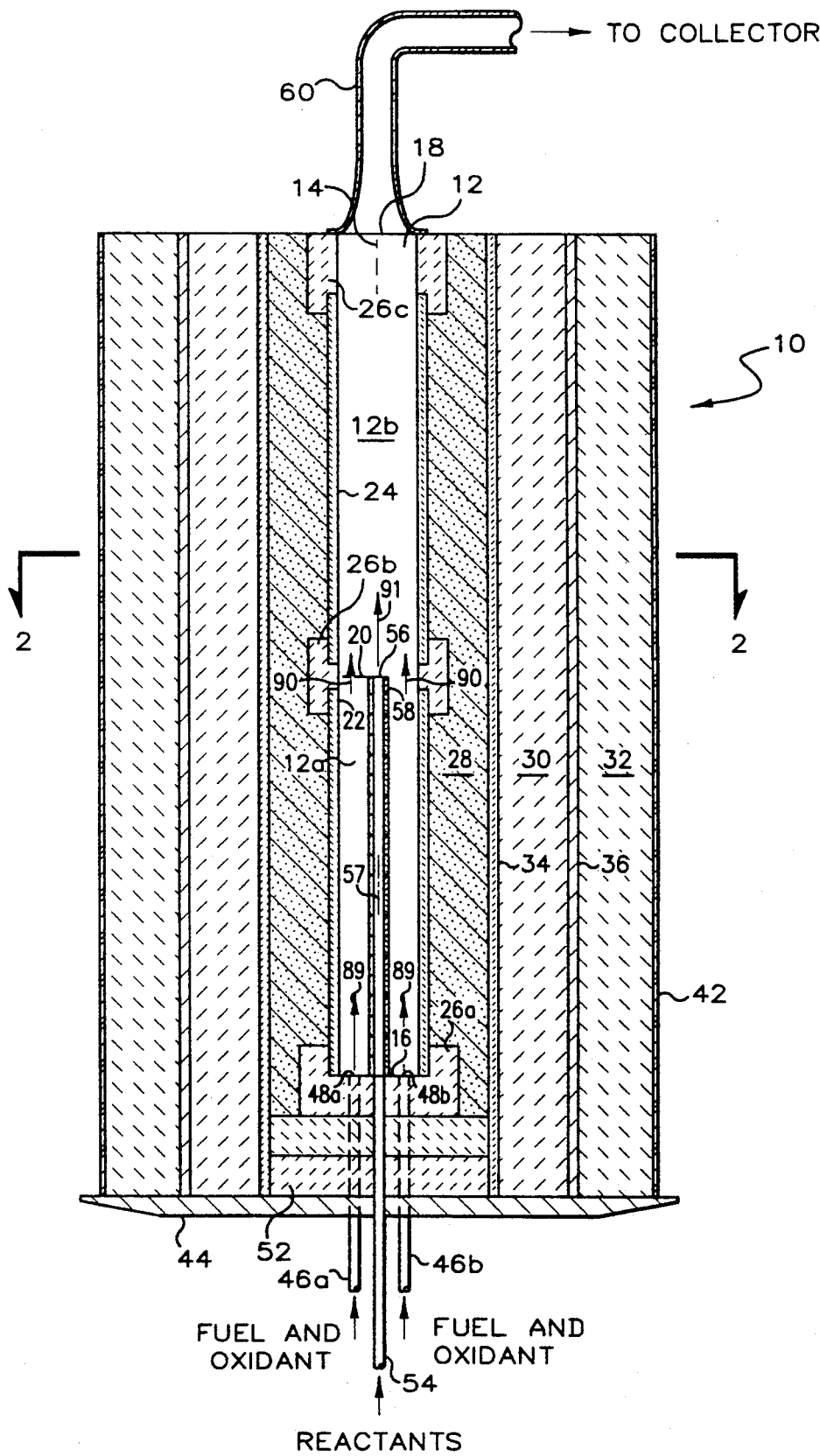
FIG. 1 is a cross-sectional view of a reactor in accordance with one embodiment of the invention.

Referring to FIG. 1, there is shown a cross-sectional view of a reactor 10 having defined therein a chamber 12 which has a longitudinal axis 14 and longitudinally separated upstream and downstream ends 16 and 18, respectively. Chamber 12 includes a combustion zone 12a and a reaction zone 12b situated such that combustion zone 12a extends from upstream end 16 to an imaginary surface, in this case planar, boundary 20 between the zones and such that the reaction zone 12b extends from boundary 20 to downstream end 18.

Chamber 12 is defined by refractory tubes 22 and 24 and also inserts 26a, b and c. Such tubes and inserts are preferably composed of a refractory material resistant to temperatures of at least 2000° C., such as zirconia, which is commercially available from Zircoa Products of Solon, Ohio.

As shown, there is provided several additional coaxially positioned layers of refractory material which are generally annular in shape and which surround tubes 22 and 24, including: layer 28, preferably comprising zirconia powder insulation, available from Zircar Products of Florida, New York, which allows for contraction and expansion of this layer; layer 30, which preferably comprises alumina-silica blanket insulation, commercially available under the trademark Fiberfrax ® from Carborundum of Niagara Falls, N.Y.; and layer 32, which may be of the same composition as layer 30. A refractory cyclinder 34, preferably low density thermal insulating alumina available from Zircar Products of Florida, New York, is illustrated as separating layers 28 and 30, and a metal cylinder 36 most preferably composed of stainless steel separates layers 30 and 32. Cylinders 34 and 36 assist in providing structural support for the reactor.

The outermost refractory layer 32 is held in place by a cloth material 42, such as fiberglass, which wraps around the exterior surface of layer 32. The bottom end of the various layers are supported by a metal plate 44. The reactor is preferably oriented vertically as shown for the sake of operating convenience. If any of the refractory material breaks or cracks it tends to stay in position if the various layers and tubes are vertically positioned. Therefore, operation can sometimes continue despite such structural defects. Other reactor orientations are within the scope of the invention, however.

Each of combustion nozzles 46a and 46b are connected to a source of fuel and oxidant and have respective outlet ends 48a and 48b which communicate with combustion zone 12a of chamber 12 at a position closely adjacent to upstream end 16 of chamber 12. As shown, nozzles 46a and 46b are surrounded by refractory inserts 52 positioned near upstream end 16. Although not shown in FIG. 1, a third combustion nozzle 46c having an associated outlet end 48c is also provided. See FIG. 2 which shows all three combustion nozzles.

A single reactant nozzle 54 is connected to a source of reactants, discussed later in detail, and extends through refractory inserts 52 and from upstream end 16 of chamber 12 to an outlet end 56 which communicates with chamber 12 at surface boundary 20. As shown, nozzle 54 has a longitudinal axis 57 which in the illustrated embodiment is parallel to longitudinal axis 14 of chamber 12. Most preferably for the purpose of optimally minimizing deposits on chamber-defining walls (hereinafter simply referred to as chamber walls) of, for example, refractory tubes 24 and 26, etc., longitudinal axis 57 corresponds to longitudinal axis 14 of chamber 12 such that said outlet 56 is positioned substantially on longitudinal axis 14. A plurality of generally annular refractory members 58, preferably composed of a suitable temperature resistant material such a zirconia-based ZYFB3 as available from Zircar Products, are preferably stacked upon one another so as to surround nozzle 54 along its length within chamber 12. Other thermal insulating layers and coatings are within the scope of the invention. Such refractory members 58 minimize heat exchange between nozzle 54 and chamber 12 so as to thereby minimize heat loss from the chamber.

Proper positioning of the nozzles with respect to each other is an important consideration in optimizing operating efficiency and quality of the product. It is desirable, for example, to position reaction nozzle outlet 56 and corresponding surface boundary 20 far enough downstream from the combustion nozzle outlets so that substantially all of the free oxygen has reacted with the fuel to form combustion products before reaching the surface boundary 20. Such positioning of the nozzles means that there is substantially no free oxygen ($O_2$ in its free gaseous state, uncombined with any other component) at surface boundary 20, thus avoiding the undesirable oxidation of one of the reactants, as will be discussed further in connection with operation of the apparatus. It is furthermore desirable to position outlet 56 sufficiently downstream to avoid the jet pump effect on gases flowing from outlet 56. This effect tends to pull the reactants upstream rather than the intended downstream flow. However, in addition to the above considerations, outlet 56 should be positioned sufficiently upstream to ensure that temperatures to which the reactants are exposed are conducive to the formation of nitride product. In regard to the above-discussed optimum positioning of reaction nozzle outlet 56, the illustrated embodiment enables particularly convenient adjustment of the position of outlet 56 by simply longitudinally withdrawing or further extending nozzle 54 from or into chamber 12.

Also shown in FIG. 1 is conduit 60 which is connected at one end to reactor 10 so as to communicate with the downstream end 18 of chamber 12. Conduit 60 receives nitride product powder therethrough which then passes to a suitable collector, discussed further below. Conduit 60 in the illustrated embodiment not only functions to transport the product to the collector, but also functions as a heat exchanger. The outside of conduit 60 is exposed to a cooling means such as ambient air which allows heat transfer via both natural convection and radiation. Such heat transfer effects cooling of the product powder as it flows through conduit 60, which is highly desirable in order to prevent undesirable reactions involving, for example, oxidation of the nitride product to form unwanted oxides. In addition, such cooling of the product powder is desirable to prevent damage to the collector from excessively hot product. In instances where a cloth filter bag is used as the collector, conduit 60 should be of sufficient length to cool the product powder to a desired temperature, typically below about 100° C., before it enters the collector. Other types of collectors require less cooling. If desired, the cooling effect can be further enhanced by surrounding conduit 60 with a cooling coil or jacket having coolant fluid flowing therethrough.

With respect to materials for conduit 60, it is preferable that a non-metallic material be employed which will not add any undesirable metal contaminants to the product. If the desired product is silicon nitride for example, quartz (silicon dioxide) is preferred since molecular structures characterized by silicon-oxygen bonds are already present in the reactor product such that essentially no additional contaminants will enter the product stream. Quartz is also a particularly preferred material because of its high emissivity and excellent thermal shock resistance. However, other heat exchange materials, including metals, are within the scope of certain aspects of the invention.

The collector can be any suitable means of collecting the product powder. One suitable collector, as discussed above, comprises a cloth filter bag connected to the downstream end of conduit 60. Other suitable collectors include metal filters, electrostatic precipitators and cyclone separators. Of course, regardless of what type of collector is used a pressure differential should preferably be established, by a suitable pump, across the collector to draw the product powder through conduit 60 and into the collector.

Figure 2:
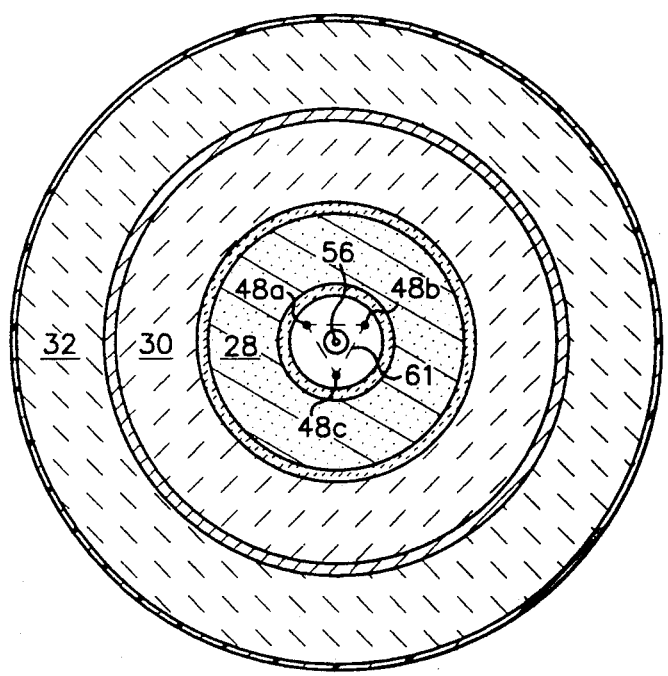
FIG. 2 is a cross-sectional view of the embodiment of FIG. 1 as viewed along line 2—2.

Referring now to FIG. 2, this view shows all three combustion nozzle outlets 48a, 48b and 48c and their relative positions with respect to reaction nozzle outlet 56. As can be seen from FIGS. 1 and 2, the combustion nozzle outlets define an imaginary linear boundary 61 whose projection in a direction generally parallel to longitudinal axis 14 of chamber 12 and onto surface boundary 20 generally surrounds outlet 56. In operation this feature advantageously provides a sheath of combustion products around reactants injected from outlet 56 so as to assist in protecting the chamber walls from deposit-forming reactions involving the reactants. As used herein and in the appended claims, the term "linear boundary" is broadly construed to include any boundary defined by a moving point, and is not limited to one or more straight line segments. In the particular embodiment illustrated, boundary 61 is generally triangular in shape and is positioned with respect to outlet 56 such that outlet 56 is generally centrally located within the above-mentioned projection of boundary 61. Most preferably, and as shown, the combustion nozzle outlets are equidistantly spaced from one another.

Referring to FIG. 3, there is shown a cross-sectional view of a portion of a nozzle labeled as 46, which represents any one of the combustion nozzles 46a, 46b and 46c which are each identical in structure and operation. Nozzle 46 comprises a tubular member 62, preferably constructed of a metal such as stainless steel, which has an inner sidewall 62a and an outer sidewall 62b. Such sidewalls define a generally annular space 64 therebetween which is connected to a source of coolant fluid such as water or ethylene glycol or a combination thereof, which could also include minor amounts of additives such as corrosion inhibitors, etc. if desired. A tubular member 66 is positioned within annular space 64 so as to generally divide the space into entrance and exit passageways for the coolant fluid. As shown, coolant fluid flows toward the tip of nozzle 46 as indicated at 68, and flows away from the tip in the opposite direction as indicated at 70. The direction of coolant fluid flow may be reversed if desired. The flow of coolant fluid through space 64 assists in preventing melting of the metallic tubular members, and also assists in preventing the flame from burning back (flashback) into nozzle 46 by keeping the interior of nozzle 46 below the autoignition temperature of the fuel/oxidant mixture. The interior of nozzle 46 is connected to a source of fuel and oxidant such that a flow of the fuel/oxidant mixture is established through nozzle 46 as indicated at 72.

Referring to FIG. 4, there is shown a cross-sectional view of nozzle 54 having outlet end 56. Nozzle 54 is preferably constructed of the same or similar metallic material as that used for nozzle 46, and includes tubular members 74 and 76. As shown, tubular member 74 is positioned generally coaxially within tubular member 76 such that a generally annular space 78 is defined between the interior surface of member 76 and the exterior surface of member 74. The interior of tubular member 74 is connected to a source of reactants to provide a flow of reactants therethrough as indicated at 79. Tubular member 76 is generally of the same design as member 62 in FIG. 2, and includes respective inner and outer sidewalls 76a and 76b between which there is defined a generally annular space 80. A tubular member 82 is positioned within annular space 80 so as to divide it into entrance and exit passageways. Space 80 is connected to a source of coolant fluid so as to establish respective entrance and exit flow paths 84 and 86. The reverse direction of coolant fluid flow can be employed if desired. The flow of coolant fluid not only assists in preventing melting of the metallic tubular members, but also helps prevent the formation of nitride deposits within nozzle 54 by maintaining the temperature of the nozzle below temperature limits conducive to nitride formation. This avoids the need to periodically clean nitride deposits from nozzle surfaces.

Annular space 78 is connected to a purge gas source to establish a flow of such purge gas through annular space 78 in the direction of outlet end 56, as indicated at 88. Thus, this flow of purge gas exits outlet end 56 in a generally annular stream so as to surround the reactants as they exit the nozzle. This annular gas stream forms a sheath around the reactants so as to prevent contact of the hot combustion gases in chamber 12 (see FIG. 1) with the reactants immediately after their exit from nozzle 54, thereby preventing the formation of nitride deposits on the tip of nozzle 54. Such deposits, if not prevented, can eventually lead to blockage of reactant flow from nozzle 54 and consequent reactor shutdown. Of course, the insulative sheath of purge gas disperses after only a few milliseconds, but this is sufficient time to allow the reactants to flow far enough away from the nozzle tip to prevent formation of undesirable deposits. The choice of purge gas is not critical, and can be, for example, an inert gas (i.e. helium or argon), a cooled waste gas as discharged from the reactor, or a reactive nitrogen-containing gas (i.e. ammonia) which can contribute nitrogen to the reactive stream for formation of nitrides.

The various gas flows are preferably established and controlled by conventional equipment not shown in the drawings. Gas can be supplied by, for example, pressurized gas bottles. The gas can pass from such a pressurized container and through an orifice plate whose orifice is sized to achieve sonic velocity of the gas. Such a sonic velocity prevents pressure disturbances from traveling upstream, so that whatever happens downstream near the reactor will not affect the desired flow rate of gas. A pressure regulator can be employed to control the rate of flow of the gas.

Turning now to another aspect of the invention, there is provided a method of making a nitride compound using the above described apparatus. Reference will be made to the drawings in describing a preferred embodiment of this method.

As used herein and in the appended claims, a nitride compound is defined as a binary compound of a first elemental component and a second, nitrogen component. Generally speaking, a nitride compound is produced in accordance with the illustrated embodiment by reacting two reactants. The first reactant contains the first component whereas the second reactant contains the second, nitrogen component.

According to certain broad aspects of the invention, the first component as contained in the first reactant may be any element capable of combining with nitrogen to form a nitride compound. For example, the first component may be a metal such as aluminum, tungsten, chromium, titanium, zirconium or molybdenum. Halides of such metals are particularly suitable as the first reactant. Or, the first component may be a metalloid such as silicon or boron. As stated previously, silicon nitride is a very useful nitride compound. Ceramic parts can be made from silicon nitride powder which have excellent mechanical strength and heat resistance. Therefore, reactants having silicon as the first component are of particular interest in connection with the present invention.

Preferred silicon-containing reactants which are compounds of silicon include silane ($SiH_4$) and substituted silanes. As used herein and in the appended claims, a substituted silane can be generally expressed by the formula SiABCD where each of A, B, C and D can be any element or combination of elements as long as at least one of A, B, C and D is not hydrogen, and where A, B, C and D can be selected from hydrogen, a halogen, an oxygen-containing group (i.e. $OSi(CH_3)_3$), a nitrogen-containing group (i.e. $NHSi(CH_3)_3$), an alkyl group, an aryl group, a silyl group, or a group containing multiple silicon atoms. Examples of such substituted silanes include: alkyl silanes such as methylsilane (($CH_3)SiH_3$), dimethylsilane (($CH_3)_2SiH_2$), trimethylsilane (($CH_3)_3SiH$) and tetramethylsilane ($Si(CH_3)_4$); halogenated silanes such as dichlorosilane ($H_2SiCl_2$); halogenated methylsilanes such as trimethyl silicon bromide (($CH_3)_3SiBr$) and dichlorodimethylsilane (($CH_3)_2SiCl_2$); siloxanes such as hexamethyldisiloxane (($CH_3)_3SiOSi(CH_3)_3$); silazanes such as hexamethyldisilazane (($CH_3)_3SiNHSi(CH_3)_3$); and silicon halides, such as silicon tetrachloride ($SiCl_4$). Cyclic and polymeric silicon compounds are also within the scope of the invention. If desired, mixtures of any of the preceding silicon-containing reactants can be employed. Silane is the presently preferred silicon-containing reactant in view of the quality of the product.

The second, nitrogen-containing reactant is preferably a hydronitride such as ammonia ($NH_3$), which is presently preferred, or hydrazine ($N_2H_4$). Although hydronitrides are preferred, any nitrogen-containing reactant capable of reacting with the first reactant to form nitride products is within the scope of certain aspects of the invention. Additional examples of suitable nitrogen-containing reactants include, for example, amines and nitrogen halides such as $NCl_3$.

The fuel, which is injected through nozzles 46a–c, is preferably an unsaturated hydrocarbon (having at least one double or triple bond between carbon atoms), such as, for example, ethylene, propylene, butene, propadiene, butadiene, acetylene, propyne, butyne and mixtures thereof. A particularly preferred unsaturated hydrocarbon fuel is a mixture of ethylene and acetylene. Employing acetylene in the fuel has been found to increase the temperature in the reaction zone, discussed further below, as compared to ethylene alone, for example, which is desirable to minimize the oxygen content in the product powder and which is further desirable where a reactant such as dichlorodimethylsilane is used which requires a higher temperature than some other reactants to achieve a desirable reaction rate. Another preferred group of hydrocarbon fuels are cyclic hydrocarbons such as cyclopropane, cyclobutane, and mixtures thereof. Other types of fuels, such as solid fuels substantially comprising pure carbon, and fuel blends are within the scope of certain aspects of the invention as long as the desired temperature conditions and carbon to oxygen ratio, later discussed, are achieved in the reactor.

The oxidant employed should be capable of accepting electrons from the fuel and is preferably an oxygen-containing gas, most preferably pure oxygen. Gaseous mixtures which include oxygen as a single component, such as air, are within the scope of the invention.

In accordance with a preferred procedure for operating the illustrated apparatus, flow of coolant fluid is started with respect to nozzles 46a–c and 54, followed by gradual heating of the reactor to normal operating temperatures. This is done to avoid thermal shock and possible breakage to the various refractory materials. One method for this preheating stage involves initial electrical heating of the refractory layers with electrical rod heaters (not shown) and heating of chamber 12 with a coiled wire electrical heater (not shown) inserted into chamber 12, followed by establishment of a combustion flame in combustion zone 12a.

In any event, the combustion flame is established in combustion zone 12a by initiating a flow of gaseous fuel through nozzles 46a–c. If the reactor has been preheated electrically, the fuel should spontaneously establish a flame by reacting with ambient air at downstream end 18 of chamber 12. If the combustion flame does not form, the fuel may be ignited with an appropriate ignition device. After the flame is established, a flow of air is initiated through nozzles 46a–c so as to produce a fuel/air mixture. This causes the flame to propagate upstream so that the flame establishes itself in combustion zone 12a. Propagation of the flame in this manner can be hazardous to an operator implementing the method such that adequate safety precautions are taken. The reactor is typically operated with this fuel/air mixture for a predetermined period, usually ½ hour to 1 hour. Operation of the reactor with air as the oxidant is part of the preliminary start-up of the reactor to gradually heat the reactor.

A flow of pure oxygen is now commenced through nozzle 46 to replace the air. The flow of such oxygen is gradually increased and the flow of air gradually decreased until a fuel/oxygen combustible mixture is obtained. The combustion flame should be monitored visually through downstream end 18 to make sure that the flame does not flash back upstream so as to enter nozzles 46a–c and cause a potentially dangerous condition. Flashback can be prevented by providing a sufficiently high velocity of fuel and oxygen exiting nozzles 46a–c.

A flow of the fuel/oxygen mixture is thus established in a direction generally parallel to axis 14 as indicated at 89, and the fuel and oxygen flow rates are set to be relatively fuel-rich in preparation for nitride production. Preferably, the elemental molar ratio of carbon to oxygen for the fuel/oxygen mixture is at least about 0.7:1, more preferably in the range of about 0.8:1 to about 1.2:1, and most preferably in the range of about 0.9:1 to about 1.1:1. As used herein, the elemental molar ratio of carbon to oxygen means the molar ratio of carbon atoms to oxygen atoms. The residence time of the combustible mixture and hot combustion products formed therefrom in combustion zone 12a is typically about 5 to about 20 milliseconds, which is sufficient time to consume substantially all of the oxygen before reaching boundary 20. Temperature conditions in combustion zone 12a are typically about 1700° C. to about 2000° C. Hot combustion products produced in combustion zone 12a flow toward and into the reaction zone 12b as indicated at 90.

The gaseous reactants are now injected into chamber 12 from reaction nozzle outlet 56, as indicated at 91, such that the reactants exit outlet 56 at boundary 20 in a direction generally parallel to the chamber axis 14, preferably generally along chamber axis 14 and toward downstream end 18. In the illustrated embodiment, the first and second reactants are premixed to give a desired molar ratio of the first component to nitrogen, typically about 1:1 to about 1:4 where silicon is the first component. Such a mixture is passed through nozzle 54 so as to exit outlet end 56 into chamber 12. If the first reactant employed is normally a liquid, such first reactant is placed in vapor form most conveniently by placing it in a bubbler and passing a purge gas therethrough. The temperature of the coolant fluid flowing through nozzle 54 can be elevated to the necessary extent to help prevent condensation of the first reactant as it passes through nozzle 54.

Flow rates are adjusted so that the elemental molar ratio of carbon to oxygen for the combination of the reactants and fuel/oxygen mixture (overall ratio) is at least about 0.7:1, preferably about 0.8:1 to about 1.2:1, and most preferably about 0.9:1 to about 1.1:1. It may be noted that the above ratio ranges are the same as those cited previously for the fuel/oxygen mixture only (combustion ratio). This is because no additional carbon or oxygen is needed in the reaction zone to form the nitride compound. It should be noted, however, that the use of certain reactants having carbon and/or oxygen therein (i.e. alkyl silanes, siloxanes, etc.), which are within the scope of certain aspects of the invention, will make the overall carbon to oxygen ratio slightly different from the combustion ratio. A carbon to oxygen ratio in the above cited ranges is desirable to produce a reducing atmosphere of carbon monoxide and hydrogen, rather than oxidizing species like carbon dioxide and water, which is believed to be conductive to the formation of nitrides instead of unwanted oxides. Employing a combustion ratio within the cited ranges as well as an overall ratio within these ranges particularly enhances conditions favorable to the production of nitrides.

To minimize or avoid the formation of minor amounts of a carbide compound along with the nitride compound, it is particularly preferred to employ a combustion and an overall elemental molar ratio of carbon to oxygen of no more than about 1. This serves to minimize the possibility that free carbon will be available in reaction zone 12b to react with the first reactant.

It is generally preferred to employ a mass ratio of no more than about 0.3. If it is desired to minimize the production of elemental silicon in the product of the reactor, it is generally preferable to employ a mass ratio of less than about 0.1, whereas a mass ratio of at least about 0.1 but no more than about 0.3 is preferred if elemental silicon is desired in such product. As used herein and in the appended claims, the term "mass ratio" is defined as the ratio of the synthesis rate (i.e. g/min) to the total mass flow rate (i.e. g/min) of the fuel plus oxidant into combustion zone 12a. The term "synthesis rate" (i.e. g/min) is defined as $(m \times f)/n$, where m represents the molecular weight (i.e. g/gmole) of the nitride compound, f represents the total molar flow rate (i.e. gmoles/min) of first component atoms into reaction zone 12b, and n represents the number of first component (i.e. silicon) atoms in the nitride compound. The synthesis rate is a theoretical value which is proportional to the flow rate of the first reactant and which assumes 100% reaction of the first component atoms to form the nitride compound. Of course, in actual practice, such 100% conversion does not occur and some losses occur due to deposit formation on the walls of chamber 12, the walls of conduit 60, etc.

Temperature conditions for at least a portion of reaction zone 12b are at least about 1300° C., preferably in the range of about 1300° C. to about 1700° C., most preferably in the range of about 1400° C. to about 1600° C. The temperature conditions in the reactor can most conveniently be monitored by means of a thermocouple (not shown) positioned in one of the refractory layers. The temperature detected by the thermocouple can be correlated to actual temperature conditions in the reactor. Of course, a thermocouple can be positioned directly in the chamber 12, but this requires use of expensive materials such as platinum and/or rhodium which are still subject to deterioration due to the high temperatures in chamber 12.

Pressure conditions in reaction zone 12b are preferably at or near atmospheric pressure. Other operating pressures are within the scope of the invention.

In reaction zone 12b, a product powder is formed from the reactants which includes the desired nitride compound and other components as is discussed further below. The product powder exits the reactor through downstream end 18 and passes into and through conduit 60 to the collector. After the desired amount of product powder is collected, the reactor is shut down by first switching to air as the oxidant and then gradually decreasing the fuel/oxidant flow rates to provide gradual cooling of the reactor. After shutdown, the reactor is typically allowed to cool for several hours before the supply of coolant fluid to the nozzles is terminated.

Figure 5:
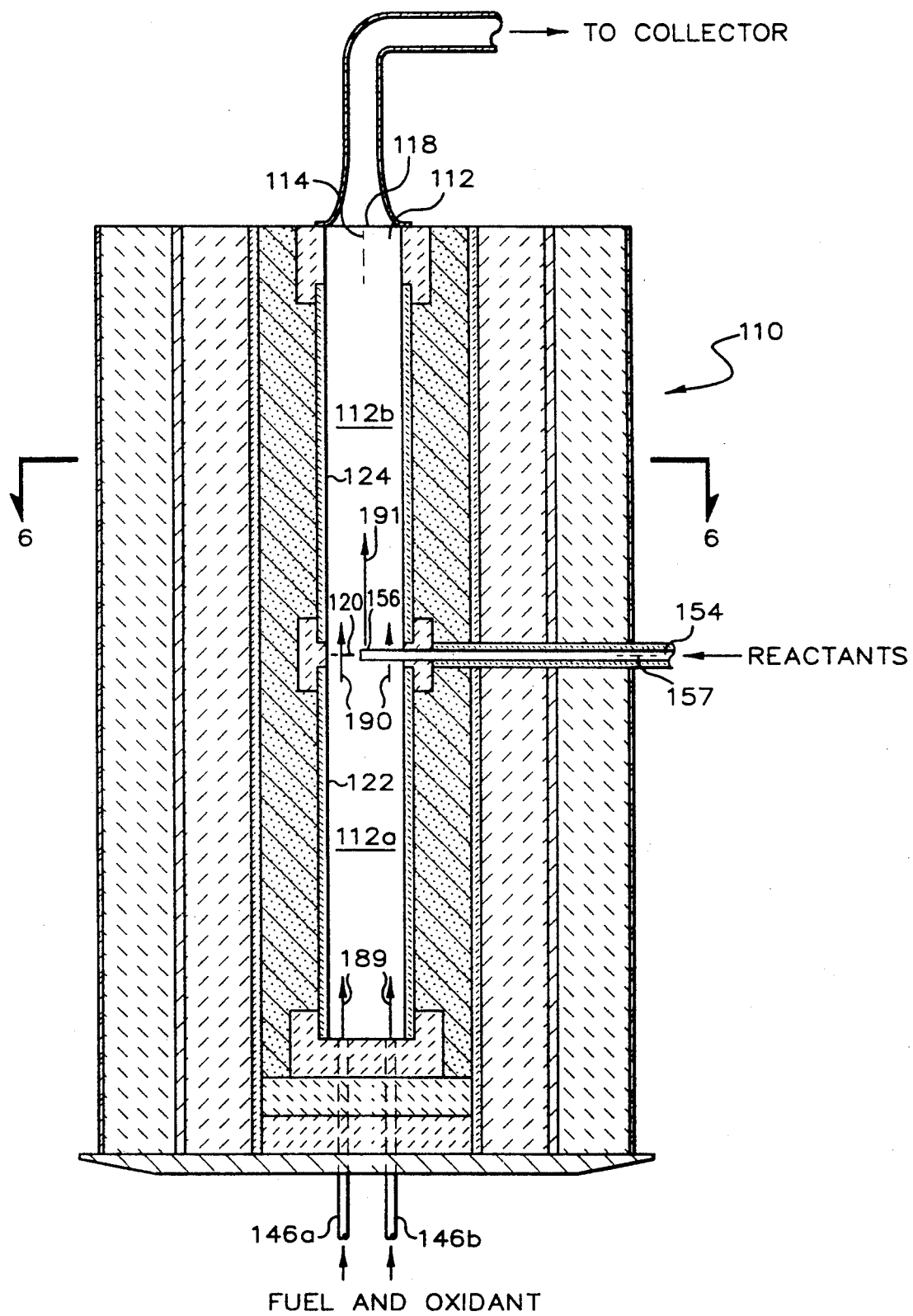
FIG. 5 is a cross-sectional view of a reactor in accordance with another embodiment of the invention.

Referring now to FIG. 5, there is shown a reactor 110 in accordance with another embodiment of the invention. The structure of the various refractory layers of reactor 110 is substantially similar to that shown in FIG. 1. The combustion nozzles, of which 146a and 146b are shown in FIG. 5, are positioned similarly to those shown in FIGS. 1 and 2 and are of the same structure as those shown in FIG. 3. This embodiment differs from the FIG. 1 embodiment with respect to the reactant nozzle 154 which is received within a refractory tube 155 so as to radially extend through the various refractory layers and into chamber 112. As shown, the longitudinal axis 157 of nozzle 154 is generally perpendicular to the longitudinal axis 114 of chamber 112. Although not visible in FIG. 5, nozzle 154 has an outlet indicated at 156 which is positioned substantially on chamber axis 114 so as to face downstream end 118 of chamber 112.

Figure 6:
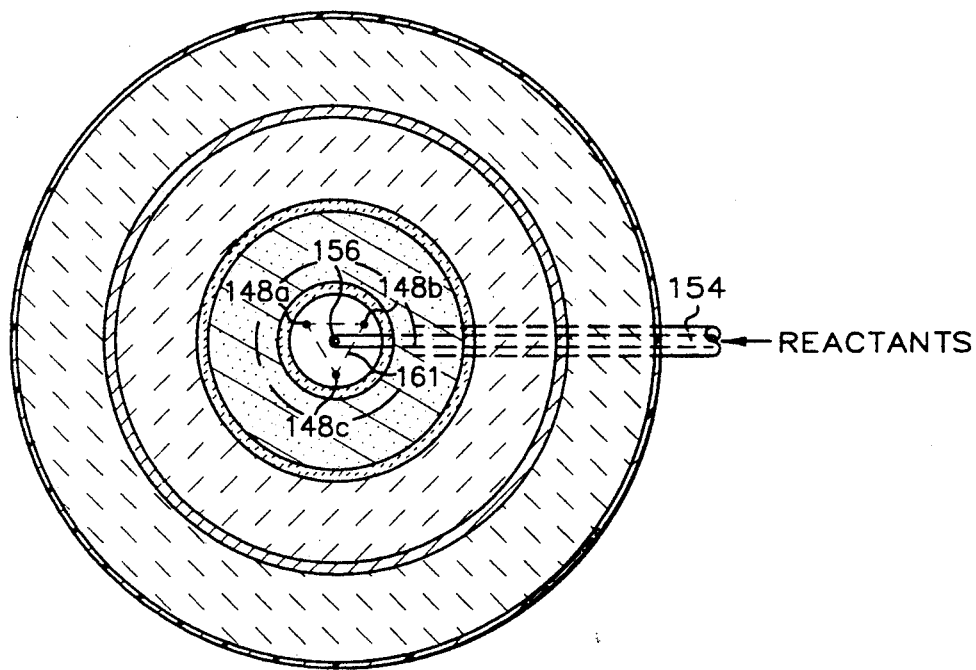
FIG. 6 is a cross-sectional view of the embodiment of FIG. 5 as viewed along line 6—6.

Referring to FIG. 6, combustion nozzle outlets 148a, 148b and 148c define a linear boundary 161 and are positioned relative to reaction nozzle outlet 156 of nozzle 154 in a manner similar to that shown in FIG. 2 with respect to combustion nozzle outlets 48a–c and reaction nozzle outlet 56.

Figure 7:
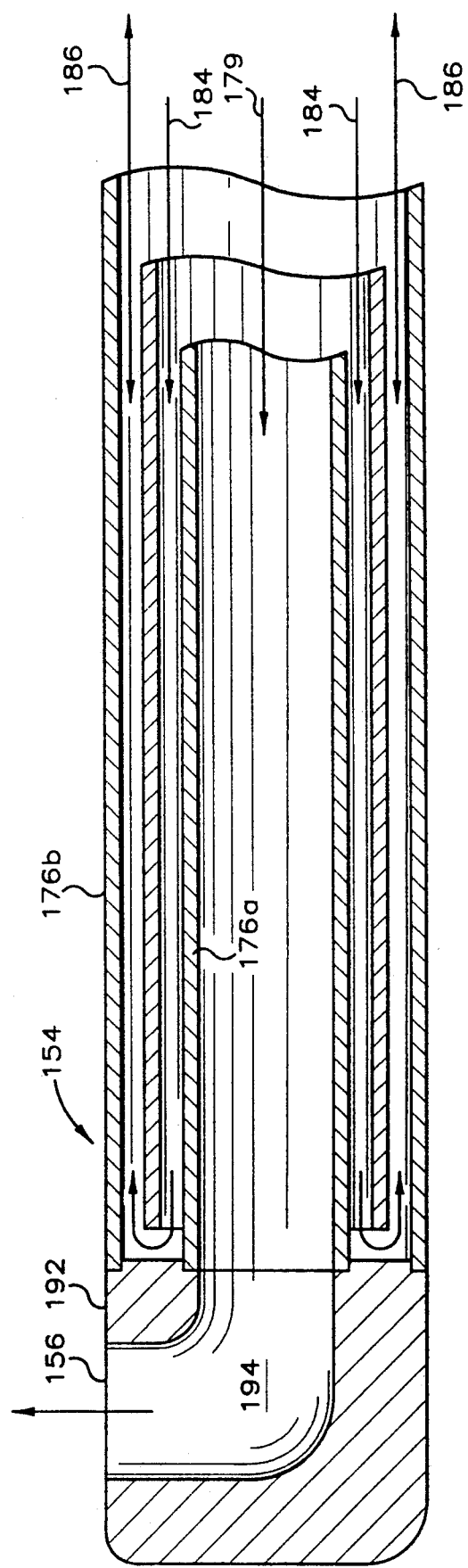
FIG. 7 is an enlarged cross-sectional view of a reactant nozzle which is shown in FIG. 5.

Referring to FIG. 7, there is shown a cross-sectional view of reaction nozzle 154. Nozzle 154 includes tubular members 176a and 176b which are oriented similarly to that of inner and outer sidewalls 76a and 76b of nozzle 54. Coolant fluid flows in the passage defined between tubular members 176a and 176b as per entry paths 184 and exit paths 186, and reactants are received through the interior of tubular member 176a as indicated at 179. Nozzle 154 further includes a tip 192 which is connected to the ends of tubular members 176a and 176b by suitable means, such as welds. An L-shaped passage 194 is defined through tip 192 so as to extend from a first end communicating with the interior of tubular member 176a to a second end which defines outlet 156. Preferably, tip 192 is composed of a metal such as nickel or copper which has a high thermal conductivity, thereby enabling quick transference of heat from tip 192 to the coolant fluid so as to avoid overheating and possible melting of the tip. It may be noted that means is not provided in nozzle 154 for providing a flow of purge gas around the reactants. This feature is omitted in this embodiment solely for the sake of simplicity of construction, and could be provided in nozzle 154 if desired.

Operation of the embodiment shown in FIGS. 5-7 is performed in a similar manner to that procedure described for the embodiment of FIGS. 1-4. A mixture of fuel and oxidant, preferably pure oxygen, is injected from the combustion nozzles into combustion zone 112a in a direction generally toward reaction zone 112b as indicated at 189. Hot combustion products produced in combustion zone 112a flow generally toward and into reaction zone 112b as indicated at 190. Although the arrows at 190 are shown as straight to indicate the general directional flow of combustion products, it should be understood that some turbulence results from flow around nozzle 154. Finally, reactants exit outlet 156 of reaction nozzle 154 at boundary 120 in a direction generally along chamber axis 114 and toward downstream end 118 as indicated at 191.

In the following description of products produced in accordance with the invention, it is to be understood that the term "weight percent" as applied to a component of a composition is based on the total weight of the composition.

The product powder as collected directly from the reactor, hereafter denoted as "raw" powder, is generally tan or white in appearance, and in the case of silicon as the first component, contains silicon nitride, silicon in addition to that in the silicon nitride and according to one aspect preferably not in elemental form, carbon, and oxygen. Such a raw product powder according to such an aspect thereof is characterized by the following weight percentages: silicon in the amount of about 40 to about 75 weight percent, preferably in the amount of about 50 to about 70 weight percent, and most preferably in the amount of about 55 weight percent to about 65 weight percent; nitrogen in the amount of about 10 to about 40 weight percent, preferably in the amount of about 15 to about 35 weight percent, and most preferably in the amount of about 25 to about 35 weight percent; carbon in the amount of about 1 to about 10 weight percent, preferably in the amount of about 1 to about 6 weight percent, and most preferably in the amount of about 1 to about 3 weight percent; and oxygen in the amount of about 1 to about 30 weight percent, preferably in the amount of about 1 to about 20 weight percent, and most preferably in the amount of about 1 to about 15 weight percent. Hydrogen can also be present in the raw product in minor but detectable amounts of between 0 and about 1 weight percent.

According to another aspect of the raw product powder, such raw product powder contains silicon nitride, carbon, oxygen, and silicon in addition to that in the silicon nitride, and further wherein at least a portion of the silicon in the raw product powder is in the form of crystalline elemental silicon. Such a raw product powder is further characterized by the following weight percentages: silicon in the amount of about 55 to about 75 weight percent and more narrowly in the amount of about 65 to about 75 weight percent; nitrogen in the amount of about 10 to about 40 weight percent and more narrowly in the amount of about 15 to about 35 weight percent; carbon in the amount of about 1 to about 10 weight percent and more narrowly in the amount of about 1 to about 6 weight percent; and oxygen in the amount of about 1 to about 15 weight percent and more narrowly in the range of about 1 to about 10 weight percent.

The raw product powder in accordance with the invention can be further characterized insofar as a sample of such powder having a relatively high oxygen content in the range of about 5 to about 15 weight percent is sinterable to a ceramic part having a density of at least about 2.7 g/cc, or about 85% of the density of pure crystalline silicon nitride, by a process comprising: pressing the raw product to a pressed ceramic part; heating the pressed part to a temperature of about 1500° C. to about 1900° C. without application of compaction force so as to produce the sintered part having the density of at least about 2.7 g/cc; wherein no steps are performed prior to the heating step for removal of any appreciable amounts of oxygen from the raw product or pressed part produced therefrom. As used herein, the term "pressing" refers to any technique for fabricating a self-supporting shape from ceramic particles. Also as used herein, the application of a "compaction force" to a ceramic part means the application of a force to the part by means of a solid member in contact with the part which mechanically compacts the part to thereby increase its density.

X-ray fluorescence analysis of the raw product indicates that the product has less than about 500 ppm of elemental impurities, wherein such elemental impurities include aluminum and those elements of higher atomic numbers, except silicon, up to and including uranium. Many of these impurities undesirably decrease the strength of the sintered nitride parts made from product powder.

Individual particles of the raw product are highly uniform and have diameters which range from about 0.01 to about 0.5 micron. Submicron and uniform particles are important characteristics in the production of fine-grained, high strength parts from a nitride powder.

The raw product powder can be further purified by additional processing to yield a purified product with higher crystallinity. This purification process typically involves two stages carried out in a conventional controlled atmosphere furnace. First, the raw powder is heated in the presence of a nitrogen-containing gas such as pure nitrogen gas at a temperature of about 1300° C. to about 1900° C. and most preferably at about 1400° C. to about 1700° C. for at least about 15 minutes and most preferably for about 1 to about 2 hours. This serves to react molecular structures having silicon-oxygen bonds with carbon to thereby remove oxygen as carbon monoxide and make the silicon available for reacting with the nitrogen-containing gas to form additional silicon nitride. Typically, the raw powder has insufficient carbon to remove a substantial portion of the oxygen, thus necessitating the addition of carbon to the raw powder before heating in the nitrogen-containing gas. Second, the powder resulting from the first purification stage is heated in an oxygen-containing atmosphere to a temperature of about 600° C. to about 900° C. and most preferably at about 600° C. to about 700° C. over a period of about at least about 15 minutes and most preferably for about 30 minutes to about 2 hours. This stage burns off remaining carbon as carbon oxides to yield a highly pure product.

Individual particles of the purified product in the form of a powder have diameters which range from about 0.1 micron to about 10 microns. The purified product is characterized, however, by a substantial portion of the particles having diameters of 1 micron and less.

Either the raw or purified product can be sintered into heat resistant, high strength parts in a conventional manner. For example, appropriate amounts of additives such as yttrium oxide and aluminum oxide can be added to the product, followed by pressing of the product to a desired shape and heating at a temperature of about 1500° C. to about 1900° C.

It is to be understood that the above description pertains to preferred embodiments of the invention, but that many variations and modifications are within the scope of certain aspects of the invention.

For example, although only a single reactant nozzle is provided in the illustrated embodiments, it is within the scope of certain aspects of the invention to provide a plurality of reactant nozzles having respective outlets which can, by way of example, be positioned around the longitudinal axis of the reactor chamber.

Other variations of the embodiments described above can involve different reactants and/or fuels. For example, it is possible to use nitrogen from the first reactant (i.e., silazane) or nitrogen produced in the combustion zone as the source of nitrogen for producing the nitride compound, in which case the second, nitrogen-containing reactant can be omitted. It is desirable in such an embodiment to utilize a carrier gas, such as helium, argon, hydrogen, carbon monoxide or mixtures thereof in admixture with the first reactant to carry the first reactant into the reactor chamber. Since a mixture of carbon monoxide and hydrogen is produced as a waste gas by the reactor, the reactor can serve as a convenient source of such carrier gas. Another possible variation could involve employing a fuel which includes a preferred unsaturated hydrocarbon as well as amounts of other types of hydrocarbons such as saturated hydrocarbons. However, this will generally decrease the heat produced by the combustion reaction so as to possibly require a supplemental heat source (i.e. electric, plasma, microwave, combustion zones exterior to the reactor chamber but in heat exchange relationship with the reactor chamber, etc.) to obtain the desired temperature conditions in the reaction zone. In any event it is preferable that the hot combustion products as produced by combustion in the combustion zone provide at least about 15% of the energy needed to maintain desired temperature conditions of at least about 1300° C. in the reaction zone.

EXAMPLES

Specific examples will now be described to further illustrate the invention. These examples should not be construed to limit the invention in any manner.

In each of the following examples, various gaseous flow rates are given in gram moles/minute (abbreviated to gmol/min hereafter). Actual measurements of flow rate were taken volumetrically at room temperature and atmospheric pressure in units of liters/minute. These volumetric measurements were converted to gmol/min by assuming there are 24.45 liters/mole for any gas at 25° C. (room temperature) and at atmospheric pressure. All flow rates for gases below are undiluted with any other gases (i.e. carrier gases).

With respect to analysis results given in various tables, the carbon and nitrogen weight percentages were obtained by means of CHNS combustion analysis, silicon percentages by X-ray fluorescence analysis, and the oxygen percentages by neutron activation analysis. In each example where an analysis was performed, CHNS analysis revealed detectable amounts of hydrogen. However, such detected amounts of hydrogen were less than 1 weight percent and are not reported in the following examples. Weight percentage results which are provided have not been normalized to 100%. Variance from 100% is attributable to normal analysis inaccuracies.

With respect to terminology and notations used hereafter, it will be understood that all degree readings obtained by X-ray diffraction are for an angle of $2\theta$.

With respect to deposits in the reactor which are reported in several examples hereafter, such deposits were not measured quantitatively in terms of thickness, etc., but visual observations were made after completion of various runs. These observations are given in subsequent examples in terms of light, medium and heavy to reflect the comparability of deposits obtained for the various runs.

EXAMPLE I

The purpose of this example is to demonstrate the formation of silicon nitride with a reactor substantially similar to that shown in FIGS. 1–4.

The reactor of this example utilized a Dacron ® filter bag to collect product powder exiting from a quartz conduit having one end in communication with the downstream end of the reactor. Important reactor dimensions are given in Table IA.

TABLE IA

| Item | Dimension |
| --- | --- |
| Diameter of Chamber 12 | 5.08 cm |
| Overall Length of Chamber 12 | 50.8 cm |
| Length of Combustion Zone 12a | 22.9 cm |
| Length of Reaction Zone 12b | 27.9 cm |
| Overall O.D. of Reactor 10 | 37.5 cm |
| O.D. of Tubular Member 62 | 0.953 cm |
| I.D. of Tubular Member 62 | 0.216 cm |
| O.D. of Tubular Member 74 | 0.318 cm |
| I.D. of Tubular Member 74 | 0.236 cm |
| O.D. of Tubular Member 76 | 0.953 cm |
| I.D. of Tubular Member 76 | 0.396 cm |

Using the above described apparatus, three runs were made using a mixture of ethylene and acetylene as the fuel and pure oxygen as the oxidant. Flow rates for the ethylene, acetylene and oxygen in each of the runs were 1.31 gmol/min, 0.33 gmol/min and 1.57 gmol/min, respectively. Accordingly, the elemental molar ratio of carbon to oxygen for the combustible mixture only (combustion C:O ratio) was 1.04. Since the reactants contain no carbon or oxygen atoms, as will be apparent below, the elemental ratio of carbon to oxygen for the combination of the reactants and the combustible mixture (overall C:O ratio) was also 1.04. Table IB summarizes other data for runs 1–3 wherein silane ($SiH_4$) and ammonia ($NH_3$) were employed as reactants at different flow rates. Table IB also indicates the flow rate of helium (He) purge gas through the reactant nozzle, the synthesis rate, the run time, product mass collected, the mass ration, and results of product analysis. The "product mass" collected is the mass of raw product actually collected in the filter bag at the completion of each run. The terms "synthesis rate" and "mass ratio" have been previously defined. In determining synthesis rate, the molecular weight of silicon nitride ($Si_3N_4$) is assumed to be about 140 g/gmol and the molar flow rate of silicon atoms into the reaction zone is equivalent to the flow rate of $SiH_4$ as given in Table IB. In determining mass ratio, the molar flow rates (gmol/min) of fuel and oxygen as given in Table IB are converted to mass flow rate (g/min).

thus indicating a decrease in product crystallinity in response to an increase in synthesis rate and mass ratio. In addition, the diffraction pattern of the product from run 3 reveals narrower peaks at 28° and 35°, superimposed on the broad peak between 20° and 40°, indicative of the presence of elemental silicon and beta silicon carbide respectively. Additional peaks at 47° and 56° also indicate the presence of elemental silicon.

It is further noted that the amplitudes of the elemental silicon peaks increase with increasing synthesis rate and mass ratio, thus indicating an associated increase in elemental silicon content.

The product from run 1 was further analyzed with respect to particle size in accordance with the following procedure. A small portion, on the order of milligrams,

TABLE IB

| Run No. | $SiH_4$ gmol/min | $NH_3$ gmol/min | He gmol/min | Syn. Rate g/min | Time mins. | Product Mass g | Mass Ratio | Product Analysis Wt. % Composition | | | |
|---|---|---|---|---|---|---|---|---|---|---|---|
| | | | | | | | | Si | N | C | O |
| 1 | 0.068 | 0.135 | 0.157 | 3.2 | 30 | 65.8 | 0.034 | 54.3 | 22.7 | 7.8 | 9.8 |
| 2 | 0.137 | 0.269 | 0.314 | 6.4 | 15 | 68.4 | 0.067 | 59.1 | 20.2 | 7.0 | 11.1 |
| 3 | 0.269 | 0.522 | 0.628 | 12.6 | 15 | 138 | 0.132 | 63.9 | 14.7 | 4.9 | 11.1 |

Product analysis results as summarized in Table IB reveal substantial weight percentages of silicon and nitrogen. This is taken to indicate the presence of silicon nitride. Considering other possible bonding of the nitrogen to other elements, nitrogen in combination with carbon or oxygen can generally form only gaseous compounds. Therefore, it is reasonable to assume that the nitrogen present in the solid product is bound to at least a portion of the silicon. The product analysis results also indicate a definite increase in the silicon to nitrogen ratio with an increase in synthesis rate (at a constant flow of combustible mixture) and consequent increase in mass ratio.

X-ray powder diffraction analysis of the raw product produced by run 1 resulted in a diffraction pattern having two very broad peaks at an angle between 20° and 40° and between 60° and 80°, respectively. These broad peaks are taken to indicate the presence of poorly crystallized silicon nitride. Each of these broad peaks is believed to result from the overlapping of a plurality of peaks which characterize silicon nitride. Superimposed upon these broad peaks are a number of narrower peaks indicating the presence of additional crystalline components, including beta silicon carbide and crystalline elemental silicon. Peaks at about 35°, 61.5° and 72° are taken to indicate the presence of some beta silicon carbide, and a small peak at 28° is taken to indicate the presence of elemental silicon.

The X-ray diffraction pattern for the product from run 2 reveals broad peaks at an angle between 20° and 40° and between 60° and 80°, taken to indicate the presence of poorly crystallized silicon nitride, and also narrower peaks at 28°, 35°, and 61.5° indicative of elemental silicon and beta silicon carbide as discussed above. This diffraction pattern has two additional peaks at 47° and 56° which are also taken to indicate elemental silicon.

Finally, the X-ray diffraction pattern for the product from run 3 exhibits a broad peak between 20° and 40°, which is taken to indicate the presence of silicon nitride. The broad peak between 60° and 80° in this diffraction pattern flattens to the point of being barely perceptible, of the product powder was placed in a beaker containing 40 cc. of a mixture of 0.07 weight percent Triton dispersant (Rohm & Haas Co., Philadelphia, Pa.) and distilled water. The resulting solution was ultrasonically treated for 10 minutes at a power level of 40 watts using a Model W-380 ultrasonic horn (Heat Systems Ultasonics Inc., Farmingdale, N.Y.). A particle size distribution was measured using a CAPA-700 Particle Analyzer (Horiba, Tokyo, Japan). The resulting particle size distribution indicates particle diameters ranging from less than about 0.04 micron to about 0.3 micron, with the largest percentage (over 50%) of particles examined falling in the particle diameter range of 0.10 to 0.20 micron.

Observed deposits at the completion of runs 1-3 were as follows: run 1-no deposits; run 2-light deposits on the upper 3 inches of the reactor chamber wall; and run 3-heavy deposits on the upper 5 inches of the chamber wall.

EXAMPLE II

The purpose of this example is to demonstrate the production of silicon nitride using different fuels in conjunction with a reactor in accordance with the design illustrated in FIGS. 1-4.

The dimensions of the reactor of this example were substantially identical to the dimensions of the reactor described in Example I, with the exception of the combustion nozzles. Tubular member 62 of each combustion nozzle had an I.D. of 0.257 cm in run 4 and an I.D. of 0.334 in run 5.

Run 4 utilized a mixture of acetylene ($C_2H_2$) and ethylene ($C_2H_4$) whereas run 5 utilized only ethylene as a fuel. Each of the runs employed silane at a flow rate of 0.269 gmol/min, giving a synthesis rate of 12.6 g/min, and ammonia at a flow rate of 0.459 gmol/min. Helium was utilized as a purge gas at a flow rate of 0.628 gmol/min in each run. Further process data and also product analysis results are summarized in Table II. Note that the C:O ratio given in Table II is the combustion C:O ratio as well as the overall C:O ratio, since these ratios are equivalent in this example.

TABLE II

| Run No. | C₂H₄ gmol/min | C₂H₂ gmol/min | O₂ gmol/min | C:O Ratio | Time mins. | Product Mass g | Mass Ratio | Product Analysis Wt. % Composition | | | |
|---|---|---|---|---|---|---|---|---|---|---|---|
| | | | | | | | | Si | N | C | O |
| 4 | 1.87 | 0.46 | 2.21 | 1.05 | 7.5 | 69.8 | 0.093 | 58.4 | 24.2 | 8.2 | 8.5 |
| 5 | 3.79 | — | 3.71 | 1.02 | 8 | 67.5 | 0.056 | 55.7 | 22.7 | 5.1 | 14.6 |

It can be seen from the above data that the product from run 5, which used only ethylene as the fuel, had a substantially higher oxygen content than the product from run 4, which used a mixture of ethylene and acetylene. These results were obtained despite the fact that run 5 employed higher fuel and oxygen flow rates than run 4.

Powder X-ray diffraction patterns for each of the products from runs 4 and 5 exhibit a broad peak between 20° and 40° and a broad peak between 60° and 80°, and also more narrow peaks at 35° and 61.5° superimposed on such respective broad peaks which are taken to indicate the presence of beta silicon carbide. The product analysis results in Table II are also indicative of the presence of silicon nitride for reasons discussed in Example I.

Observed deposits at the completion of runs 4 and 5 were as follows: run 4-light deposits on upper 3 inches of reactor chamber wall; and run 5-no deposits.

EXAMPLE III

The purpose of this example is to demonstrate the production of a highly pure silicon nitride-containing product using the reactor of FIGS. 1-4. This example further provides a temperature measurement in the reaction zone which was made during silicon nitride production.

Dimensions of the reactor of this example were substantially identical to those cited for the reactor of Example I, with the exception of the I.D. of tubular member 62, which was 0.257 cm.

The run of this example, hereafter denoted as run 6, employed the following process conditions: fuel of ethylene and acetylene at flow rates of 1.56 gmol/min and 0.65 gmol/min respectively; an oxygen flow rate of 2.21 gmol/min; a combustion C:O ratio of 1.00; reactants silane and ammonia at flow rates of 0.147 gmol/min and 0.190 gmol/min; an ammonia purge gas flow rate of 0.372 gmol/min; an overall C:O ratio of 1.00; a synthesis rate of 6.9 g/min; a run time of 7 minutes; product mass collected of 35 g; and a mass ratio of 0.053.

The reaction zone temperature was measured as 1542° C. along the reactor chamber axis and 12.7 cm upstream from the downstream end of chamber 12 of FIG. 1. A thermocouple comprising bare wires of different compositions were employed to make this measurement. One wire was composed of 100% iridium whereas the other wire was composed of 60% iridium and 40% rhodium. The two wires were run through a two hole electrical insulator made of 99.8% alumina, and the insulator and wires were encased in a 0.79 cm O.D. closed end 99.8% alumina tube to protect the wires from attack by the silicon reactant. A thermocouple junction was formed by extending the wires about 0.5 cm beyond the alumina tube and spot welding the wires together. This junction was located on the longitudinal axis of the reactor chamber. Since the reactor walls are insulated and hence operate close to the same temperature as the gases in the chamber, the thermocouple readings were not corrected for radiation error.

Product analysis revealed the following weight percentages with respect to the raw product collected from run 6: 57.5 wt. % Si; 31.8 wt. % N; 1.0 wt. % C; and 9.2 wt. % O. These results evidence the presence of silicon nitride for reasons cited in Example I.

Powder X-ray diffraction analysis of the raw product revealed a broad peak between about 20° and about 40° and a broad peak between about 60° and about 80°, which are taken to indicate the presence of silicon nitride. It is noted in particular that the pattern exhibits no peaks indicative of beta silicon carbide or elemental silicon.

EXAMPLE IV

The purpose of this example is to demonstrate the sintering of a ceramic part from a raw product as collected from a reactor in accordance with the design of FIGS. 1-4.

The reactor of this example was substantially identical to the reactor of Example III.

The run of this example, hereafter denoted as run 7, employed the following process conditions: fuel of ethylene and acetylene at flow rates of 1.83 gmol/min and 0.45 gmol/min; combustion C:O ratio of 1.03; reactants of silane and ammonia at flow rates of 0.137 gmol/min and 0.196 gmol/min respectively; ammonia purge gas flow of 0.346 gmol/min; overall C:O ratio of 1.03; synthesis rate of 6.4 g/min; run time of 565 minutes; product mass collected of 3354 g; and a mass ratio of 0.048. It is noted that run 7 was actually two runs carried out at different times at identical process conditions. The run times and product masses were added together to give the values above.

Product analysis of the collected raw product revealed the following weight percentages, taken to indicate the presence of silicon nitride for reasons given in Example I: 57.4 wt. % Si; 28.6 wt. % N; 3.2 wt. % C; 9.2 wt. % O. Powder X-ray diffraction analysis of the raw product revealed a broad peak at between about 20° and about 40° and a broad peak at between about 60° and about 80°. These peaks, as well as the above-mentioned weight percentages, are taken to indicate the presence of silicon nitride. Only a small shoulder at around 35° is superimposed on the first peak, which is possibly indicative of a small amount of beta silicon carbide.

A mixture of 89.50 grams of the raw product, 1.25 grams Dow Binder (Dow Chemical), 16.50 grams triethylene glycol (Aldrich Chemical), 5.50 grams of alumina (Buehler, Lake Bluff, Ill.), and 5.00 grams of Yttria (H.C. Starck, Berlin, FRG.) were milled using Burundum cylinders (U.S. Stoneware, Mahwah, N.J.) in a 0.5 gallon high density polyethylene jar for 20.5 hours. The resulting mixture was sieved using a US standard #40 brass sieve. A disc 4.5 cm in diameter and 0.27 cm thick was produced from uniaxially pressing the mixture at 2000 psi. Isostatically pressing the disc at 50,000 psi produced a final disc 4.1 cm in diameter and 0.26 cm thick. The disc was sintered in a controlled atmosphere furnace using the following procedure: evacuate furnace to 200 millitorr; pressure furnace to 5 psig with nitrogen; heat furnace to 1000° C. at a rate of 100° C./minute; heat to 1250° C. at a rate of 70° C./minute and hold at 1250° C. for 10 minutes; heat to 1882° C. at a rate of 2.8° C./minute and hold at 1882° C. for 1.0 minute; cool furnace to room temperature.

The sintered disc had a final density of 3.14 g/cc, 99.9% of "theoretical density", or the density of pure crystalline silicone nitride.

EXAMPLE V

The purpose of this example is to demonstrate the production of silicon nitride using a reactor similar to that shown in FIGS. 5-7.

Dimensions of the reactor of this example were substantially the same as those cited for the reactor of Example I, with the exception of the I.D. of tubular member 176a, which was 0.333 cm. Of course, the embodiment of the reactant nozzle of FIG. 7 does not include a tubular member analogous to tubular member 74.

Three runs were made at different synthesis rates. Run 8 used only one reactant nozzle whose outlet was positioned on the reactor chamber axis. Runs 9 and 10 used two and four reactant nozzles, respectively. Such nozzles were symmetrically spaced around the chamber axis such that their tips contacted one another. The additional reactant nozzles were needed to accomodate the increased total reactant flows. It was found that reactant flow rate through an individual reactant nozzle in accordance with the design of FIG. 7 had to be limited to a relatively low flow rate to avoid a disrupted flow pattern resulting from reactant flow through the L-shaped passage in the tip.

Flow rates for the combustible mixture in each run were as follows: ethylene at 1.26 gmol/min, acetylene at 0.32 gmol/min, oxygen at 1.57 gmol/min, and a combustion C:O ratio of 1.01. The overall C:O ratio was also 1.01 in each run.

Additional data is summarized in Table V.

TABLE V

| Run No. | SiH$_4$ gmol/min | NH$_3$ gmol/min | Syn. Rate g/min | Time mins. | Product Mass g | Mass Ratio | Product Analysis Wt. % Composition | | | |
|---|---|---|---|---|---|---|---|---|---|---|
| | | | | | | | Si | N | C | O |
| 8 | 0.137 | 0.322 | 6.4 | 25 | 104 | 0.068 | 58.1 | 31.0 | 2.5 | 7.2 |
| 9 | 0.269 | 0.522 | 12.6 | 10 | 87 | 0.134 | 60.7 | 31.2 | 1.8 | 7.6 |
| 10 | 0.553 | 1.07 | 25.8 | 11 | 172 | 0.275 | 70.0 | 23.0 | 1.5 | 8.2 |

The product analysis results in Table V are taken to indicate the presence of silicon nitride for reasons discussed in Example I. These results also show an increase in the silicon to nitrogen weight ratio in response to an increase in synthesis rate and mass ratio.

Figure 8:
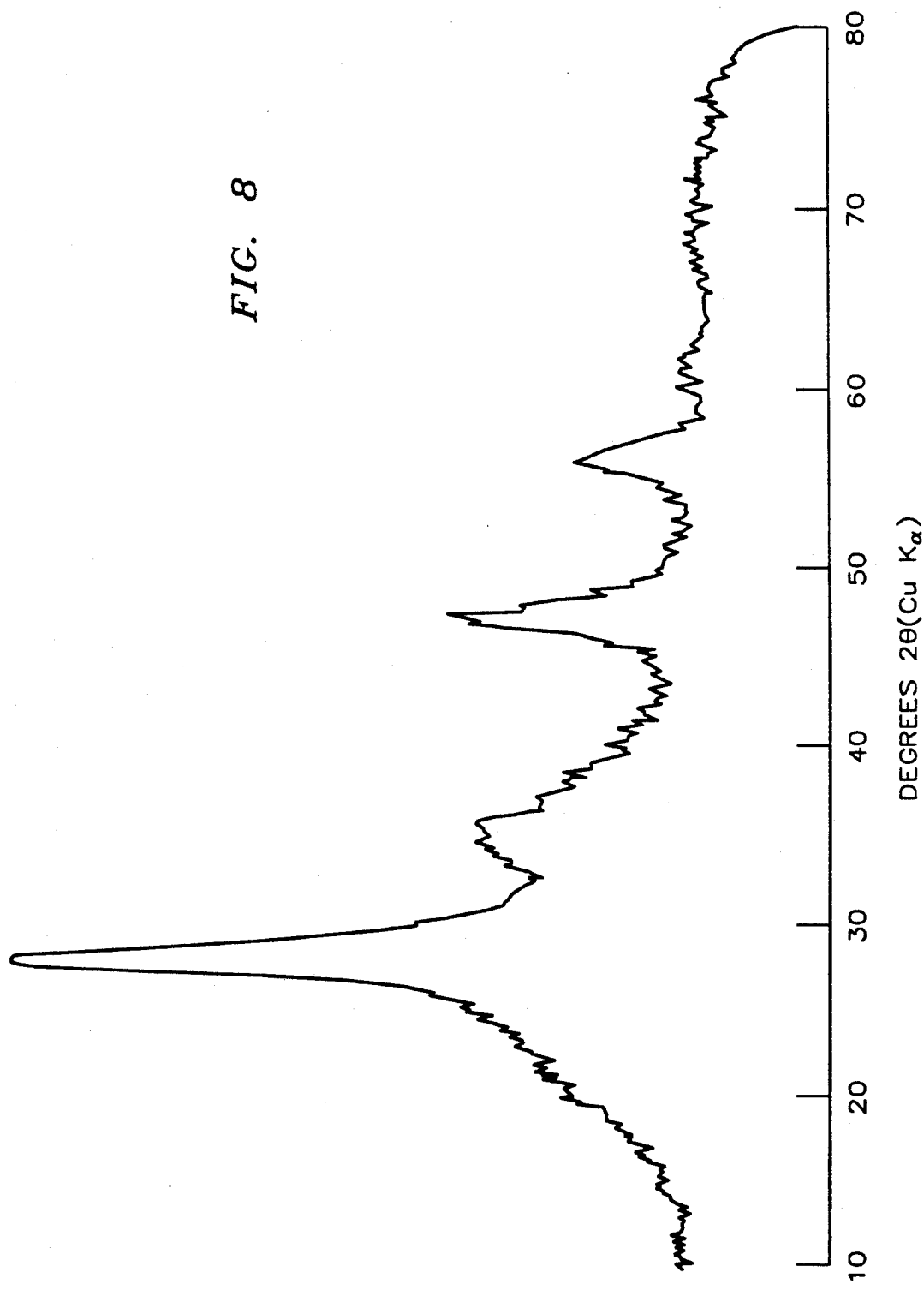
FIG. 8 is an X-ray diffraction pattern for a product produced in Example V.

A powder X-ray diffraction pattern for the product from run 8 exhibits a very broad peak between 20° and 40° which is taken to indicate the presence of poorly crystallized silicon nitride. The diffraction pattern for the product from run 9 also shows a broad peak between 20° and 40° but with small shoulders superimposed thereon at 28° and 47° indicative of elemental silicon. The diffraction pattern obtained for the product from run 10, shown in FIG. 8, has a broad peak similar to the patterns corresponding to runs 8 and 9, and also reveals very distinct narrow peaks at 28°, 47° and 56° which are indicative of elemental silicon. It is noted that the above diffraction patterns appear to show an increase in elemental silicon in response to an increase in synthesis rate and mass ratio.

Observed deposits were recorded only for run 10, which were found to be heavy with a significant buildup on the reactant nozzles.

That which is claimed is:

1. A product powder which comprises silicon nitride and elemental silicon and characterized by silicon in the amount of about 55 to about 75 weight percent, nitrogen in the amount of about 10 to about 40 weight percent, carbon in the amount of about 1 to about 10 weight percent, and oxygen in the amount of about 1 to about 15 weight percent, said product powder being produced by a method comprising the steps of:

providing a reactor having a chamber defined therein which has a longitudinal axis and longitudinally separated upstream and downstream ends, wherein the chamber comprises a combustion zone and a reaction zone such that the combustion zone longitudinally extends from said upstream end to a surface boundary between the zones and such that the reaction zone longitudinally extends from said surface boundary to said downstream end;

establishing a flow of a combustible mixture in the combustion zone so as to flow in a direction generally toward the reaction zone, wherein the combustible mixture comprises a mixture of a fuel and an oxidant;

combusting the combustible mixture in the combustion zone to produce hot combustion products which flow generally toward and into the reaction zone;

injecting at least one reactant containing silicon into the chamber from at least one outlet of at least one reactant nozzle such that said at least one reactant exits said at least one reactant nozzle outlet at said surface boundary in a direction generally parallel to said longitudinal axis, wherein temperature conditions in at least a portion of the reaction zone are at least about 1300° C. and wherein the elemental molar ratio of carbon to oxygen for the combination of the combustible mixture and said at least one reactant is at least about 0.7:1, said at least one reactant being capable of reacting in the reaction zone to form the silicon nitride;

whereby the product powder comprising the silicon nitride and also elemental silicon is produced in the reaction zone.

2. A product as recited in claim 1, wherein said silicon is present in the amount of about 65 to about 75 weight percent, nitrogen is present in the amount of about 15 to about 35 weight percent, carbon is present in the amount of about 1 to about 6 weight percent, and oxygen is present in the amount of about 1 to about 10 weight percent.

3. A product as recited in claim 2 wherein said elemental silicon is crystalline.

4. A product as recited in claim 3 wherein said product powder comprises particles having diameters in the range of about 0.01 to about 0.5 micron.

5. A product as recited in claim 1 which is produced by employing a mass ratio of at least about 0.1.

6. A product as recited in claim 2 which is produced by employing a mass ratio of at least about 0.1.

7. A product as recited in claim 1 wherein said oxidant comprises oxygen.

8. A powder comprising silicon nitride and elemental silicon and characterized by silicon in the amount of about 55 to about 75 weight percent, nitrogen in the amount of about 10 to about 40 weight percent, carbon in the amount of about 1 to about 10 weight percent, and oxygen in the amount of about 1 to about 15 weight percent.

9. A powder as recited in claim 8 wherein said silicon is present in the amount of about 65 to about 75 weight percent, nitrogen is present in the amount of about 15 to about 35 weight percent, carbon is present in the amount of about 1 to about 6 weight percent, and oxygen is present in the amount of about 1 to about 10 weight percent.

* * * * *